(12) United States Patent
Ninoyu et al.

(10) Patent No.: US 10,549,735 B2
(45) Date of Patent: Feb. 4, 2020

(54) VEHICULAR BRAKING DEVICE

(71) Applicants: ADVICS CO., LTD., Kariya-shi, Aichi-ken (JP); TOYOTA JIDOSHA KABUSHIKI KAISHA, Toyota-shi, Aichi-ken (JP)

(72) Inventors: Masaki Ninoyu, Obu (JP); Takahiro Okano, Chiryu (JP)

(73) Assignees: ADVICS CO., LTD., Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 142 days.

(21) Appl. No.: 15/759,721

(22) PCT Filed: Sep. 29, 2016

(86) PCT No.: PCT/JP2016/078958
§ 371 (c)(1),
(2) Date: Mar. 13, 2018

(87) PCT Pub. No.: WO2017/057648
PCT Pub. Date: Apr. 6, 2017

(65) Prior Publication Data
US 2018/0339683 A1 Nov. 29, 2018

(30) Foreign Application Priority Data
Sep. 30, 2015 (JP) ................................. 2015-194832

(51) Int. Cl.
*B60T 8/172* (2006.01)
*B60T 13/66* (2006.01)
*B60T 13/14* (2006.01)

(52) U.S. Cl.
CPC ............ *B60T 8/172* (2013.01); *B60T 13/662* (2013.01); *B60T 13/148* (2013.01); *B60T 2201/03* (2013.01)

(58) Field of Classification Search
CPC ...... B60T 8/172; B60T 13/662; B60T 13/148; B60T 2201/03
See application file for complete search history.

(56) References Cited

U.S. PATENT DOCUMENTS 5,651,592 A * 7/1997 Yasuno ............... B60T 8/17636
303/156
6,164,734 A * 12/2000 Otomo .................... B60T 7/042
303/122.1

(Continued)

FOREIGN PATENT DOCUMENTS

JP 2003-320872 A1 11/2003
JP 2005-35467 A 2/2005

(Continued)

OTHER PUBLICATIONS

International Search Report (PCT/ISA/210) dated Dec. 13, 2016, by the Japanese Patent Office as the International Searching Authority for International Application No. PCT/JP2016/078958.

(Continued)

*Primary Examiner* — Sze-Hon Kong
(74) *Attorney, Agent, or Firm* — Buchanan Ingersoll & Rooney PC (57) ABSTRACT

A hydraulic pressure braking force generation device is provided with a first control unit for performing control for inhibiting excessive responses in which the input pressure is controlled such that the output pressure is within a first region set using a braking target oil pressure as a reference, a second control unit for performing control for responsiveness in which the increase speed or decrease speed of the input pressure is increased so as to be larger than that in the (Continued)

control for inhibiting excessive responses, to cancel response delay and a switching unit which, on the basis of the state of the braking target oil pressure, switches between the control for inhibiting excessive responses performed by the first control unit and the control for responsiveness performed by the second control unit.

5 Claims, 3 Drawing Sheets

(56) References Cited

U.S. PATENT DOCUMENTS

| | | | | |
|---|---|---|---|---|
| 8,210,621 | B2* | 7/2012 | Ajiro | B60T 8/172 |
| | | | | 303/113.4 |
| 2004/0135427 | A1* | 7/2004 | Inagaki | B60T 8/36 |
| | | | | 303/119.1 |
| 2006/0066146 | A1* | 3/2006 | Otomo | B60T 8/26 |
| | | | | 303/151 |
| 2010/0270854 | A1* | 10/2010 | Okano | B60T 1/10 |
| | | | | 303/3 |
| 2013/0207451 | A1* | 8/2013 | Ohkubo | B60T 8/3655 |
| | | | | 303/9.62 |
| 2015/0175145 | A1 | 6/2015 | Nakata et al. | |
| 2015/0291137 | A1* | 10/2015 | Takeuchi | B60T 8/4072 |
| | | | | 303/10 |
| 2016/0052498 | A1* | 2/2016 | Isono | B60T 7/042 |
| | | | | 303/115.2 |
| 2016/0339887 | A1 | 11/2016 | Okano et al. | |
| 2016/0339889 | A1 | 11/2016 | Okano et al. | |
| 2017/0015293 | A1* | 1/2017 | Yagashira | B60T 8/4081 |
| 2017/0282876 | A1* | 10/2017 | Oosawa | B60T 8/4081 |
| 2018/0094722 | A1* | 4/2018 | Katakura | F16H 61/0206 |

FOREIGN PATENT DOCUMENTS

| | | |
|---|---|---|
| JP | 2015-120397 A | 7/2015 |
| WO | WO 2015/111440 A1 | 7/2015 |
| WO | WO 2015/111732 A1 | 7/2015 |

OTHER PUBLICATIONS

Office Action (Notification of Reasons for Refusal) dated Apr. 10, 2018, by the Japanese Patent Office in corresponding Japanese Patent Application No. 2015-194832, and an English Translation of the Office Action (8 pages).

* cited by examiner

VEHICULAR BRAKING DEVICE

TECHNICAL FIELD

This invention relates to a vehicular braking device.

BACKGROUND ART

One type of a vehicular braking device has been known for example, in the Patent Literature 1. In the vehicular braking device shown in FIG. 1 of the Patent Literature 1, a feed-forward control and a feed-back control for a linear valve are executed so that the control hydraulic pressure Pwc which corresponds to the wheel cylinder pressure of each vehicle wheel becomes the target hydraulic pressure Pref. In the disclosure of the Patent literature 1, the vehicular braking device is intended to achieve both improvement in responsiveness of braking control and suppression of excess responsiveness thereof which are normally not compatible.

CITATION LIST

Patent Literature

[Patent Literature 1] JP2005/35467A

SUMMARY OF INVENTION

Technical Problem(s)

There is a demand in the vehicular braking device disclosed in the Patent Literature 1 that both improvement in responsiveness of braking control and suppression of excess response thereof can be achieved in the case a hysteresis that is generated due to a response delay of output pressure relative to the input pressure at the initial stage of the starting of the pressure increasing operation or at the initial stage of the starting of the pressure decreasing operation.

Accordingly, this invention was made in consideration with the above-mentioned situation and the invention pertains to provide a vehicular braking device which can achieve both further improvements in responsiveness of braking control and suppression of excess response thereof.

Solution to Problem(s)

The vehicular braking device according to the invention of claim 1 includes a hydraulic pressure generating device which outputs an output pressure by the operation of an inputted input pressure, wherein the hydraulic pressure generating device generates a response delay of output pressure change relative to an input pressure change at the initial time of starting the pressure increasing operation or at the initial stage of starting pressure decreasing operation when the output pressure is intended to be increased or decreased. The vehicular braking device further includes a first control portion which executes an excess response suppression priority control that controls the input pressure such that the output pressure is within a first area set based on the braking target hydraulic pressure as a reference, a second control portion which executes a responsiveness priority control that cancels the response delay by increasing an increasing speed of the input pressure or a decreasing speed thereof more than the increasing speed of the input pressure or the decreasing speed thereof at the excess response suppression priority control and a switching portion which switches over a control between the excess response suppression priority control executed by the first control portion and the responsiveness priority control executed by the second control portion based on a state of the braking target hydraulic pressure.

Effect of Invention

According to the invention of this application, even the hydraulic pressure generating device generates a response delay that is a delay of response of output pressure change relative to the input pressure change at the initial stage of starting the pressure increasing operation or at the initial stage of starting the pressure decreasing operation, the second control portion executes the responsiveness priority control. As a result, the response delay can be cancelled to thereby improve the responsiveness at the initial stage of starting the pressure increasing operation or at the initial stage of starting the pressure decreasing operation. Further, the switching portion appropriately switches over the control between the responsiveness priority control and the excess response suppression priority control. Accordingly, the invention can provide a vehicular braking device which can achieve further improvements in responsiveness and at the same time achieve the excess response suppression.

EMBODIMENTS FOR IMPLEMENTING INVENTION

Figure 1:
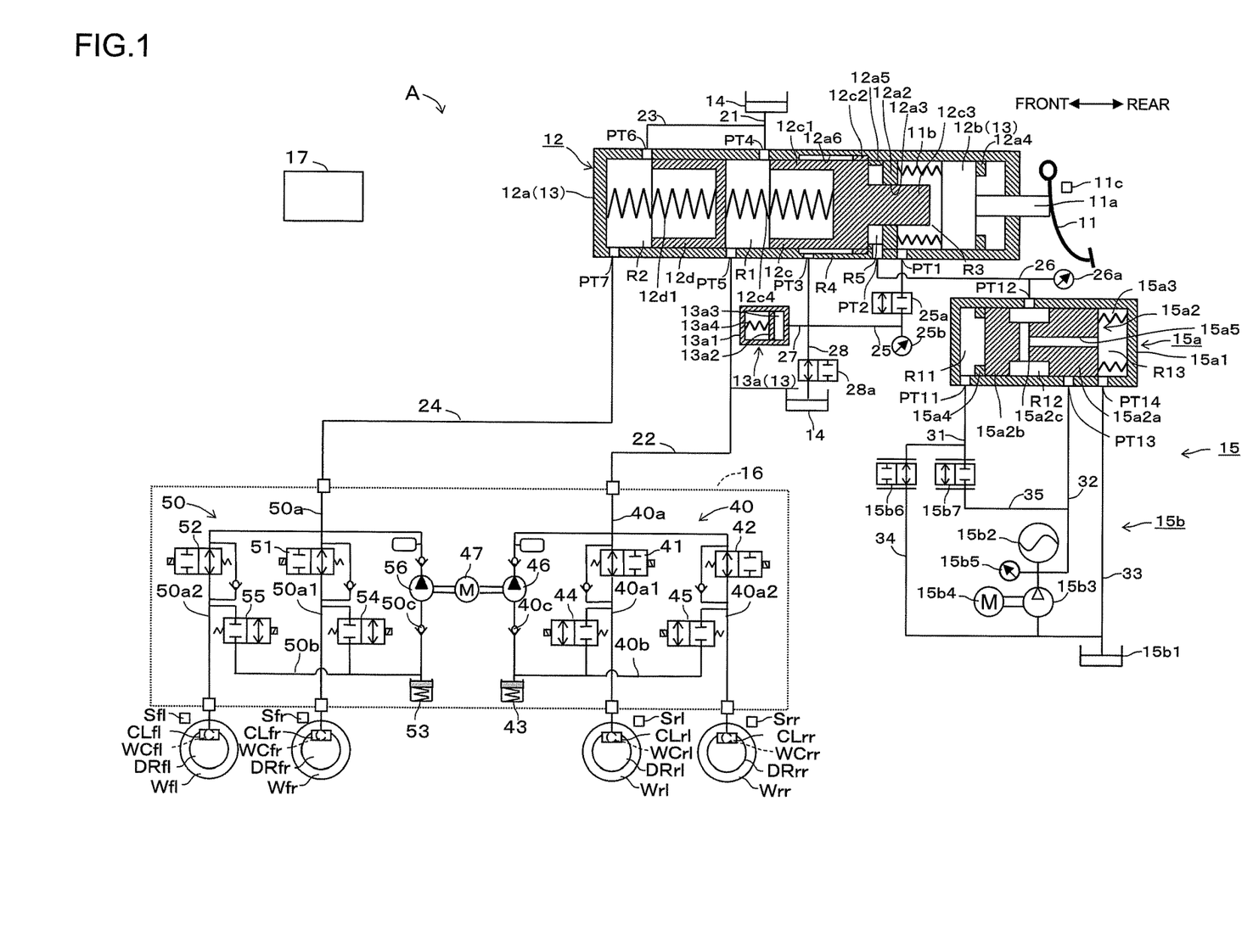
FIG. 1 is an outline schematic view of a vehicular braking device according to one embodiment of the invention.

The embodiment of the vehicular braking device according to one embodiment of the invention adapted to a vehicle will be explained hereinafter with reference to the attached drawings. The vehicle is equipped with a hydraulic pressure braking force generating device A (vehicular braking device) which applies brakes to the vehicle by applying the hydraulic pressure braking force to directly to each vehicle wheel Wfl, Wfr, Wrl and Wrr. The hydraulic pressure braking force generating device A includes a brake pedal 11 which corresponds to a brake operating member, a master cylinder 12, a stroke simulator portion 13, a reservoir 14, a booster mechanism 15 (hydraulic pressure generating device), an actuator 16 (brake hydraulic pressure adjusting device), a brake ECU 17, and a wheel cylinder WC, as shown in FIG. 1. The hydraulic pressure braking force generating device A corresponds to the vehicular braking device.

The wheel cylinder WC restricts the rotation of the respective wheels W and is disposed in the caliper CL. The wheel cylinder WC serves as a braking force applying mechanism which applies braking force to the wheels W of the vehicle based on the pressure of the brake fluid (brake hydraulic pressure) from the actuator 16. When the brake hydraulic pressure is supplied to the wheel cylinder WC, each piston (not shown) in each wheel cylinder WC pushes a pair of brake pads (not shown) which serves as a friction member and squeezes a disc rotor DR which serves as a rotational member rotating unitary with the wheel W from both sides thereof to thereby restrict the rotation of the rotor DR. It is noted here that in this embodiment, a disc type brake device is used but a drum type brake device may be used. The wheel W means either one of the right/left front/rear wheels Wfr, Wfl, Wrr and Wrl.

The brake pedal 11 is connected to the stroke simulator portion 13 and the master cylinder 12 via an operation rod 11a. A pedal stroke sensor 11c (hereinafter referred to also simply as "stroke sensor") which detects a brake pedal stroke (operation amount: hereinafter referred to simply as "stroke") which corresponds to a braking operation state by depression of the brake pedal 11 is provided in the vicinity of the brake pedal 11. The brake ECU 17 is connected to this stroke sensor 11c and the detected signal (detection result) from the stroke sensor 11c is outputted to the brake ECU 17.

The master cylinder 12 supplies the actuator 16 with the brake fluid in response to the operation amount of the brake pedal 11 (brake operating member) and is formed by a cylinder body 12a, an input piston 12b, a first master piston 12c and a second master piston 12d, etc.

The cylinder body 12a is formed in a substantially bottomed cylinder shape housing having a bottom surface closed. The cylinder body 12a includes therein a partition wall portion 12a2 which extends inwardly with a shape of flange at the inner peripheral side of the cylinder body 12a. A through-hole 12a3 is formed at the central portion of the partition wall portion 12a2 and is penetrating therethrough in a front/rear direction. An inner circumferential surface of the partition wall portion 12a2 is provided with a through hole 12a3 at a central portion thereof, penetrating through the partition wall portion 12a2 in front and rearward direction. The cylinder body 12a is provided with a first master piston 12c and a second master piston 12d at an inner peripheral portion thereof at a portion further front side than the partition wall portion 12a2. The first and the second master pistons 12c and 12d are liquid-tightly movable in an axial direction in the cylinder body 12a.

The cylinder body 12a is provided with an input piston 12b at an inner peripheral portion thereof at a portion further rear side than the partition wall portion 12a2. The input piston 12b is liquid-tightly movable in an axial direction in the cylinder body 12a. The input piston 12b slidably moves within the cylinder body 12a in response to the operation of the brake pedal 11.

The operating rod 11a which is operable in association with the brake pedal 11 is connected to the input piston 12b. The input piston 12b is biased in a direction where the volume of the first hydraulic pressure chamber R3 expands, i.e., in a rearward direction (right direction as viewed in the drawing) by means of a compression spring 11b. When the brake pedal 11 is depressed, the operating rod 11a advances forward overcoming the biasing force of the compression spring 11b. By this advance movement of the operating rod 11a, the input piston 12b advances in association with the movement of the operating rod 11a. When the depression operation of the brake pedal 11 is released, the input piston 12b retreats by the biasing force of the compression spring 11b and is brought into contact with a restriction projecting portion 12a4 for positioning.

The first master piston 12c includes a pressurizing cylindrical portion 12c1, a flange portion 12c2 and a projecting portion 12c3 in order from the front and these portions are formed integrally as a unit. The pressurizing cylindrical portion 12c1 is formed in a substantially bottomed cylinder shape having an opening at a front portion thereof and a bottom wall at a rear portion thereof. The pressurizing cylindrical portion 12c1 is liquid-tightly movably provided in the inner peripheral surface of the cylinder body 12a. A coil spring-shaped biasing member 12c4 is provided in the inner space of the pressurizing cylindrical portion 12c1 between the first master piston 12c and the second master piston 12d. The first master piston 12c is biased in a rear direction by the coil spring 12c4. In other words, the first master piston 12c is biased by the coil spring 12c4 in a rearward direction and is finally brought into contact with a restriction projecting portion 12a5 for positioning. This position is defined to be the initial position (predetermined position) at the time the depression operation of the brake pedal 11 is released.

The flange portion 12c2 is formed to have a larger diameter than the diameter of the pressurizing cylindrical portion 12c1 and is liquid-tightly and slidably disposed on an inner peripheral surface of a large diameter portion 12a6 in the cylinder body 12a. The projecting portion 12c3 is formed to have a smaller diameter than the diameter of the pressurizing cylindrical portion 12c1 and is slidably in liquid-tightly provided on the through hole 12a3 of the partition wall portion 12a2. The rear end portion of the projecting portion 12c3 projects into an inner space of the cylinder body 12a, passing through the through hole 12a3 and is separated from the inner peripheral surface of the cylinder body 12a. The rear end surface of the projecting portion 12c3 is separated from the bottom wall of the input piston 12b and the separation distance is formed to be variable.

The second master piston 12d is arranged in the cylinder body 12a at a front side relative to the first master piston 12c. The second master piston 12d is formed in a substantially bottomed cylinder shape having an opening at a front portion thereof. A coil spring 12d1 which serves as a biasing member is disposed in the inner space of the second master piston 12d between the second piston 12d and a closed inner bottom surface of the cylinder body 12a. The second master piston 12d is biased by the coil spring 12d1 in a rearward direction. In other words, the second master piston 12d is biased by the coil spring 12d1 towards a predetermined initial position.

The master cylinder 12 is formed by a first master chamber R1, a second master chamber R2, a first hydraulic pressure chamber R3, a second hydraulic pressure chamber R4 and a servo chamber (driving hydraulic pressure chamber) R5. The first master chamber R1 is defined by the inner peripheral surface of the cylinder body 12a, the first master piston 12c (front side of the pressurizing cylindrical portion 12c1) and the second master piston 12d. The first master chamber R1 is connected to the reservoir 14 via the hydraulic passage 21 which is connected to the port PT4. Further, the first master chamber R1 is connected to the hydraulic passage 40a (actuator 16) via the hydraulic passage 22 which is connected to the port PT5.

The second master chamber R2 is defined by the inner peripheral surface of the cylinder body 12a and the front side of the second master piston 12d. The second master chamber R2 is connected to the reservoir 14 via the hydraulic passage 23 which is connected to the port PT6. Further, the second master chamber R2 is connected to the hydraulic passage 50a (actuator 16) via the hydraulic passage 24 which is connected to the port PT7.

The first hydraulic pressure chamber R3 is formed between the partition wall portion 12a2 and the input piston 12b and is defined by the inner peripheral surface of the cylinder body 12a, the partition wall portion 12a2, the projecting portion 12c3 of the first master piston 12c and the input piston 12b. The second hydraulic pressure chamber R4 is formed at the side of the pressurizing cylindrical portion 12c1 of the first master piston 12c and is defined by the large diameter portion 12a6 of the cylinder body 12a, the pressurizing cylindrical portion 12c1 and the flange portion 12c2. The first hydraulic pressure chamber R3 is connected to the second hydraulic pressure chamber R4 via the hydraulic passage 25 which is connected to the port PT1 and the port PT3.

The servo chamber R5 is formed between the partition wall portion 12a2 and the pressurizing cylindrical portion 12c1 of the first master piston 12c and is defined by the inner peripheral surface of the cylinder body 12a, the partition wall portion 12a2, the projecting portion 12c3 of the first master piston 12c and the pressurizing cylindrical portion 12c1. The servo chamber R5 is connected to an output chamber R12 via the hydraulic passage 26 which is connected to the port PT2.

The pressure sensor 26a is a sensor that detects the servo pressure (driving hydraulic pressure) which is supplied to the servo chamber R5 and is connected to the hydraulic passage 26. The pressure sensor 26a sends the detection signal (detection result) to the brake ECU 17.

The stroke simulator portion 13 is formed by the cylinder body 12a, the input piston 12b, the first hydraulic pressure chamber R3 and a stroke simulator 13a which is in fluid communication with the first hydraulic pressure chamber R3. The first hydraulic pressure chamber R3 is in fluid communication with the stroke simulator 13a via the hydraulic passages 25 and 27 which are connected to the port PT1. It is noted that the first hydraulic pressure chamber R3 is in fluid communication with the reservoir 14 via a connection passage (not shown).

The stroke simulator 13a generates on the brake pedal 11a stroke (reaction force) which magnitude depends on the operation state of the brake pedal 11. The stroke simulator 13a is formed by a cylindrical portion 13a1, a piston portion 13a2, a reaction force hydraulic pressure chamber 13a3 and a spring 13a4. The piston portion 13a2 liquid-tightly slidably moves within the cylindrical portion 13a1 in response to the braking operation by the brake pedal 11. The reaction force hydraulic pressure chamber 13a3 is formed between and defined by the cylindrical portion 13a1 and the piston portion 13a2. The reaction force hydraulic pressure chamber 13a3 is in fluid communication with the first hydraulic pressure chamber R3 and the second hydraulic pressure chamber R4 via the hydraulic passages 27 and 25. The spring 13a4 biases the piston portion 13a2 in a direction where the volume of the reaction force hydraulic pressure chamber 13a3 decreases.

It is noted that the first control valve 25a which is a normally closed type electromagnetic valve is disposed in the hydraulic passage 25. The second control valve 28a which is a normally open type electromagnetic valve is disposed in the hydraulic passage 28 which connects the hydraulic passage 25 and the reservoir 14. When the first control valve 25a is in a closed state, the fluid communication between the first and the second hydraulic pressure chambers R3 and R4 is interrupted. This fluid communication interruption keeps the constant separation distance between the input piston 12b and the first master piston 12c to allow the coordinative movement therebetween. Further, when the first control valve 25a is in an open state, the fluid communication between the first hydraulic pressure chamber R3 and the second hydraulic pressure chamber R4 is established. Thus, the volume change of the first and the second hydraulic pressure chambers R3 and R4 caused by the advance or retreat movement of the first master piston 12c can be absorbed by the transfer of the brake fluid.

The pressure sensor 25b is a sensor that detects the reaction force hydraulic pressure in the second hydraulic pressure chamber R4 and the first hydraulic pressure chamber R3 and is connected to the hydraulic passage 25. The pressure sensor 25b detects the pressure in the second hydraulic pressure chamber R4 when the first control valve 25a is in a closed state and also detects the pressure (or the reaction force hydraulic pressure) in the first hydraulic pressure chamber R3 which is in fluid communication with the second hydraulic pressure chamber R4 when the first control valve 25a is in an open state. The pressure sensor 25b sends the detection signal (detection result) to the brake ECU 17.

The booster mechanism 15 generates a servo pressure in response to the operation amount of the brake pedal 11. The booster mechanism 15 is a hydraulic pressure generating device which outputs an output pressure (in this embodiment, the servo pressure) by the operation of the inputted input pressure (in this embodiment, the pilot pressure) and generates a response delay in which the change of the output pressure relative to the change of the input pressure is delayed at the initial stage of starting of the pressure increasing operation or the pressure decreasing operation when the output pressure is intended to be increasing or decreasing. The booster mechanism 15 includes a regulator 15a and a pressure supply device 15b.

The regulator 15a is configured to have a cylinder body 15a1 and a spool 15a2 which slides in the cylinder body 15a1. The regulator 15a is formed by a pilot chamber R11, the output chamber R12 and a hydraulic pressure chamber R13.

The pilot chamber R11 is defined by the cylinder body 15a1 and a front end surface of a second large diameter portion 15a2b of the spool 15a2. The pilot chamber R11 is connected to the pressure decreasing valve 15b6 and the pressure increasing valve 15b7 (hydraulic passage 31) which are connected to the port PT11. A restriction projecting portion 15a4 is provided on the inner peripheral surface of the cylinder body 15a1 to position the spool 15a2 by contacting the front end surface of the second large diameter portion 15a2b with the restriction projecting portion 15a4. The input pressure is inputted in the pilot chamber R11.

The output chamber R12 is defined by the cylinder body 15a1 and the small diameter portion 15a2c of the spool 15a2, the rear end surface of the second large diameter portion 15a2b and the front end surface of the first large diameter portion 15a2a. The output chamber R12 is connected to the servo chamber R5 of the master cylinder 12 via the hydraulic passage 26 which is connected to the port PT12 and the port PT2. Further, the output chamber R12 is connectible with the accumulator 15b2 via the hydraulic passage 32 which is connected to the port PT13. The output chamber R12 outputs the output pressure by the operation of the input pressure.

The hydraulic pressure chamber R13 is defined by the cylinder body 15a1 and the rear end surface of the first large diameter portion 15a2a of the spool 15a2. The hydraulic pressure chamber R13 is connectible with the reservoir 15b1 via the hydraulic passage 33 which is connected to the port PT14. A spring 15a3, which biases the spool 15a2 in a direction where the volume of the hydraulic pressure chamber R13 increases, is disposed in the hydraulic pressure chamber R13.

The spool 15a2 is formed by the first large diameter portion 15a2a, the second large diameter portion 15a2b and the small diameter portion 15a2c. The first large diameter portion 15a2a and the second large diameter portion 15a2b are structured to be liquid-tightly movable within the cylinder body 15a1. The small diameter portion 15a2c is arranged between the first large diameter portion 15a2a and the second large diameter portion 15a2b and is formed integrally therewith as a unit. The small diameter portion 15a2c is formed to have a diameter smaller than the first large diameter portion 15a2a and the second large diameter portion 15a2b. Further, a communication passage 15a5 which connects the output chamber R12 and the hydraulic pressure chamber R13 is formed in the spool 15a2.

The pressure supply device 15b also serves as a drive portion which drives the spool 15a2. The pressure supply device 15b includes a reservoir 15b1 which is a low pressure source, an accumulator 15b2 which is a high pressure source that accumulates the brake fluid, a pump 15b3 which pumps the brake fluid from the reservoir 15b1 into the accumulator 15b2 and an electric motor 15b4 which drives the pump 15b3. The reservoir 15b1 is exposed to the atmospheric pressure and the hydraulic pressure in the reservoir 15b1 is the same level with the atmospheric pressure. The pressure in the low pressure source is lower than the pressure in the high pressure source. The pressure supply device 15b is provided with a pressure sensor 15b5 which detects the pressure of the brake fluid supplied from the accumulator 15b2 and outputs the detected result to the brake ECU 17.

Further, the pressure supply device 15b is provided with a pressure decreasing valve 15b6 and the pressure increasing valve 15b7. The pressure decreasing valve 15b6 is a normally open type electromagnetic valve which opens in a non-energized state. The flow-rate of the pressure decreasing valve 15b6 is controlled by the instructions from the brake ECU 17. One side of the pressure decreasing valve 15b6 is connected to the pilot chamber R11 via the hydraulic passage 31 and the other side thereof is connected to the reservoir 15b1 via the hydraulic passage 34. The pressure increasing valve 15b7 is a normally closed type electromagnetic valve which closes in a non-energized state. The flow-rate of the pressure increasing valve 15b7 is controlled by the instructions from the brake ECU 17. One side of the pressure increasing valve 15b7 is connected to the pilot chamber R11 via the hydraulic passage 31 and the other side thereof is connected to the accumulator 15b2 via the hydraulic passage 35 and the hydraulic passage 32 which is connected to the hydraulic passage 35.

The operation of the regulator 15a will be explained briefly hereinafter. In the case where the pilot pressure is not supplied to the pilot chamber R11 from the pressure decreasing valve 15b6 and the pressure increasing valve 15b7, the spool 15a2 is positioned at the initial position by means of a biasing force of the spring 15a3 (See FIG. 1). The initial position of the spool 15a2 is determined by the contact of the front end surface of the spool 15a2 with the restriction projecting portion 15a4. This initial position is the position immediately before the rear end surface of the spool 15a2 closes the port PT14. As explained, when the spool 15a2 is in the initial position, the port PT14 and the port PT12 are in fluid communication with each other through the communication passage 15a5 and at the same time the port PT13 is closed by the spool 15a2.

In the case where the pilot pressure formed by the pressure decreasing valve 15b6 and the pressure increasing valve 15b7 increases in response to the brake pedal 11 operation, the spool 15a2 moves in a rearward direction (right side in FIG. 1), overcoming the biasing force of the spring 15a3. The spool 15a2 moves to the position where the port PT13 is open. Then, the port PT14 which has been in the open state, is closed by the spool 15a2. (Pressure increasing operation).

By the force balance between the pushing force at the front end surface of the second large diameter portion 15a2b2 of the spool 15a2 and the force corresponding to the servo pressure, the position of the spool 15a2 is fixed. This position of the spool 15a2 is defined to be the "holding position". The port PT13 and the port PT14 are closed by the spool 15a2. (Holding operation).

In the case where the pilot pressure formed by the pressure decreasing valve 15b6 and the pressure increasing valve 15b7 decreases in response to the brake pedal 11 operation, the spool 15a2 which is in the holding position now moves in a frontward direction by the biasing force of the spring 15a3. Then, the port PT13 which has been in the closed state by the spool 15a2 keeps the closed state. The port PT14 which has been in the closed state is open. Under this state, the port PT14 and the port PT12 are in fluid communication with each other through the communication passage 15a5 (Pressure decreasing operation).

The actuator 16 is a device which adjusts the brake hydraulic pressure to be applied to each wheel cylinder WC and is provided with a first conduit system 40 and a second conduit system 50. The first conduit system 40 controls the brake hydraulic pressure to be applied to the left rear wheel Wrl and the right rear wheel Wrr and the second conduit system 50 controls brake hydraulic pressure applied to the right front wheel Wfr and the left front wheel Wfl. In other words, the conduit system is a front/rear conduit brake system.

The hydraulic pressure supplied from the master cylinder 12 is transmitted to the respective wheel cylinders WCrl, WCrr, WCfr and WCfl through the conduit systems 40 and 50. In the first conduit system, the hydraulic passage 40a is disposed which connects the hydraulic passage 22 and the wheel cylinders WCrl, WCrr and in the second conduit system 50, the hydraulic passage 50a is disposed which connects the hydraulic passage 24 and the wheel cylinders WCfr, WCfl. Through these hydraulic passages 40a and 50a, the hydraulic pressure supplied from the master cylinder 12 is transmitted to the wheel cylinders WCrl, WCrr, WCfr and WCfl.

The hydraulic passages 40a and 50a are branched to two passages, 40a1 and 40a2 and 50a1 and 50a2, respectively. In the branched hydraulic passages 40a1 and 50a1, the first pressure increasing control valves 41 and 51 which control increasing of the brake hydraulic pressure to the wheel cylinders WCrl and WCfr are disposed respectively and in the branched hydraulic passages 40a2 and 50a2, the second pressure increasing valves 42 and 52 which control increasing of the brake hydraulic pressure to the wheel cylinders WCrr and WCfl, are disposed respectively.

These first pressure increasing valves 41, 42 and the second pressure increasing valves 51, 52 are formed by a two-position electromagnetic valve which can control the valve state to the communication state and the interrupted state. The first pressure increasing valves 41, 42 and the second pressure increasing valves 51, 52 are formed by a normally open type valve which controls the valve state such that when the control current to the solenoid coil provided in the first pressure increasing valves 41, 42 and the second pressure increasing valves 51, 52 is zero value (non-energized state), the valve becomes in a fluid communication state and when the control current to the solenoid coil flows (energized state), the valve becomes in a fluid interrupted state.

The passage portions between the first and the second pressure increasing valves 41, 42 and 51, 52 and the wheel cylinders WCrl, WCrr and WCfr, WCfl in the hydraulic passages 40a, 50a are connected to the reservoirs 43, 53 via the hydraulic passage 40b, 50b as a pressure decreasing hydraulic passage, respectively. The first pressure decreasing control valves 44, 45 and the second pressure decreasing control valves 54, 55 which are formed by a two-position electromagnetic valve which can control the valve state to the communication state and the interrupted state, are disposed in the hydraulic passages 40b, 50b, respectively. The first pressure decreasing valves 44, 45 and the second pressure decreasing valves 54, 55 are formed by a normally closed type valve which controls the valve state such that when the control current to the solenoid coil provided in the first pressure decreasing valves 44, 45 and the second pressure decreasing valves 54, 55 is zero value (non-energized state), the valve becomes in a fluid interrupted state and when the control current to the solenoid coil flows (energized state), the valve becomes in a fluid communication state.

The hydraulic passages 40c and 50c, which are the return hydraulic passages, are provided between the reservoirs 43, 53 and the hydraulic passages 40a and 50a which are the main hydraulic passages. In the return hydraulic passages 40c and 50c, the pumps 46 and 56 are disposed which are driven by the motor 47 and suction or discharge the brake fluid from the reservoirs 43, 53 towards the master cylinder 12 side or towards the wheel cylinders WCrl, WCrr and WCfr, WCfl side.

The pumps 46, 56 suctions the brake fluid from the reservoirs 43, 53 and discharges the same to the hydraulic passages 40a, 50a thereby to supply the wheel cylinder WCrl, WCrr and WCfr, WCfl side with the brake fluid.

The brake ECU 17 is structured such that the detection signals from the wheel speed sensors Sfl, Srr, Sfr and Srl which are provided at the respective vehicle wheels Wfl, Wrr, Wfr and Wrl are inputted thereto. The brake ECU 17 calculates the wheel speed of the respective wheels, a presumed vehicle speed and the slip ratio, etc., based on the detection signals from the wheel speed sensors Sfl, Srr, Sfr and Srl. The brake ECU 17 executes anti-skid control (ABS control) based on the calculation result.

Various controls using the actuator 16 are executed at the brake ECU 17. For example, the brake ECU 17 outputs the control current that controls the various control valves 41, 42, 44, 45, 51, 52, 54 and 55 and the motor 47 which drives pumps provided in the actuator 16 to control the hydraulic pressure circuit in the actuator 16 to thereby independently control the respective wheel cylinder pressure transmitted to the wheel cylinders WCrl, WCrr, WCfr and WCfl. For example, the brake ECU 17 executes the anti-skid control which prevents the wheels from locking by executing pressure decreasing, pressure increasing and holding operations when the vehicle wheels are about to slip in a braking operation, or executes a stability control (sideslip prevention control) which turns the vehicle with an ideal locus by suppressing the sideslip tendency (under steer or over steer tendency) by automatically pressurizing the wheel cylinder pressure of the control subject wheel.

Figure 2:
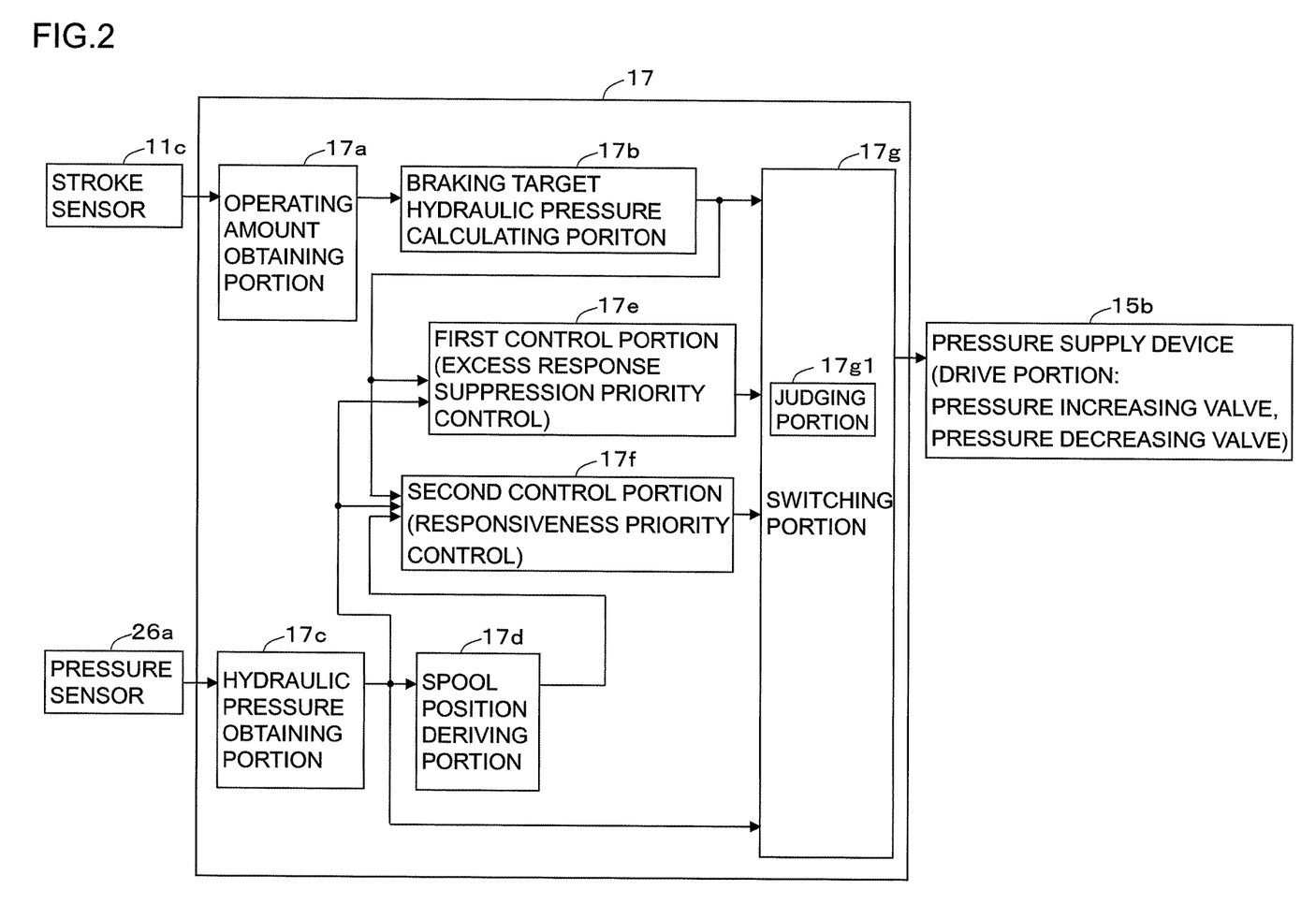
FIG. 2 is a block diagram of brake ECU indicated in FIG. 1.

The brake ECU 17 includes an operating amount obtaining portion 17a, a braking target hydraulic pressure calculating portion 17b, a hydraulic pressure obtaining portion 17c, a spool position deriving portion 17d, a first control portion 17e, a second control portion 17f and a switching portion 17g.

The operating amount obtaining portion 17a obtains the operating amount of the brake pedal 11 (operating amount associating with the brake operation: stroke) from the stroke sensor 11c. It is noted that the operating amount obtaining portion 17a may obtain an operating force detected by a sensor which directly detects the operating force (for example, stroke) acting on the brake pedal 11, instead of obtaining the operating amount of the brake pedal 11.

The braking target hydraulic pressure calculating portion 17b obtains the stroke from the operating amount obtaining portion 17a, and calculates the braking target hydraulic pressure in accordance with the operation state (for example, the stroke) of the brake operating member or in response to a demand from other system. For example, the braking target hydraulic pressure corresponds to the braking target hydraulic pressure of the servo pressure. Further, the braking target hydraulic pressure may be the braking target hydraulic pressure of the master cylinder pressure. (In such case, it is preferable to additionally provide a pressure sensor which detects the master cylinder pressure). Further, the braking target hydraulic pressure calculating portion 17b provides a map which indicates the correlation between the stroke and the braking target hydraulic pressure, and calculates the braking target hydraulic pressure based on the map. Regarding the above mentioned another system, for example, a pre-crash system can be applicable, which prevents the collision of the vehicle by automatically generating the braking force when the vehicle is detected to be in a high risk of collision.

The hydraulic pressure obtaining portion 17c obtains the servo pressure (actual hydraulic pressure which is actually generated) in the output chamber R12 from the pressure sensor 26a. The servo pressure obtained by the hydraulic pressure obtaining portion 17c is outputted to the later explained spool position deriving portion 17d, the first control portion 17e and the switching portion 17g.

The spool position deriving portion 17d derives the relative position of the spool 15a2 relative to the cylinder body 15a1 (hereinafter, referred to also as "spool relative position"). According to the embodiment, the spool position deriving portion 17d presumes the position of the spool. However, the position of the spool can be directly detected and in such case, the spool position deriving portion also includes a deriving of direct detection. The spool position deriving portion 17d functions as the spool position obtaining portion when the spool position is obtained by a sensor which directly detects the position of the spool.

The spool position deriving portion 17d derives the spool relative position based on the servo pressure obtained by the hydraulic pressure obtaining portion 17c. It is a prerequisite for this deriving method that the servo pressure is generating (In particular, there is a change in the servo pressure). In concrete, the spool position deriving portion 17d derives the relative position according to the following mathematic formula M1:

$$\text{Spool Relative Position} = (\text{Servo Pressure Change Amount } \Delta Ps / \text{Rigidity } Ka \text{ of Pilot Chamber } R11) / \text{Area } S \text{ of Regulator } 15a) \quad (M1)$$

In this mathematic formula M1, "Servo Pressure Change Amount $\Delta Ps$/Rigidity Ka of Pilot Chamber R11" represents the hydraulic fluid amount (volume) of hydraulic fluid flowing into or out of the pilot chamber R11 when there is a change in the servo pressure. The unit of the "Servo Pressure Change Amount $\Delta Ps$" is Pascal and the unit of rigidity Ka of the pilot chamber R11 is Pascal/cm3 (or pascal/cc).

When the hydraulic fluid amount in the pilot chamber R11 changes, the pressure in the pilot chamber R11 changes, i.e., the volume of the pilot chamber R11 changes. The spool 15a2 is held to the position where a force corresponding to the pressure in the hydraulic pressure chamber R13 balances with a force corresponding to the resultant force of the force corresponding to the pressure in the pilot chamber R11 and the biasing force of the spring 15a3. (Holding position). Under this state, the pressure in the hydraulic pressure chamber R13 and the pressure in the output chamber R12 become the same level pressure. In other words, the change amount of the servo pressure and the change amount of the pilot pressure are the same and accordingly, "Servo Pressure Change Amount ΔPs/Rigidity Ka of Pilot Chamber R11" represents the hydraulic fluid amount (volume) of the hydraulic fluid flowing into or out of the pilot chamber R11 when there is the change in the servo pressure.

It is noted that the absolute position of the spool 15a2 (hereinafter referred to also as "spool absolute position") can be calculated with respect to a randomly set reference position P0. In other words, the absolute position of the spool 15a2 is calculated by adding or subtracting the above derived spool relative position to or from the reference position P0. The reference position P0 can be set to an idling position at the pressure increasing operation in the initial stage of brake pedal 11 depression, a holding position under the brake control being executed or the idling position at the pressure decreasing operation.

The area S of the regulator 15a corresponds to the cross-sectional area of the bore of the cylinder body 15a1 and further, the area S of the regulator 15a corresponds to the pressure receiving surface of the rear end surface of the first large diameter portion 15a2a of the spool 15a2 and the pressure receiving surface of the front end surface of the second large diameter portion 15a2b of the spool 15a2. The magnitude of these the areas is the same with the cross-sectional area of the bore of the cylinder body 15a1.

The spool position deriving portion 17d derives the spool relative position based on the hydraulic fluid amount in the pilot chamber R11. This method can derive the spool relative position even when the servo pressure is not generated, or when the servo pressure is at a constant pressure that is equal to or more than zero (0). In concrete, the spool position deriving portion 17d derives the spool relative position by the following mathematic formula (M2):

Spool Relative Position=Hydraulic fluid Amount $V$ in Pilot Chamber/Area $S$ of Regulator 15a: (M2)

Wherein, the "Hydraulic fluid Amount V in Pilot Chamber" corresponds to the hydraulic fluid amount of the brake fluid in the pilot chamber R11. This hydraulic fluid amount V in the pilot chamber is not actually detected, but is calculated from the obtained pilot flowing into or out of hydraulic fluid amount from the time the braking operation starts up to the current time.

It is noted that in this method, the absolute position of the spool 15a2 ca be calculated based on a randomly decided reference position P0. In other words, the absolute position of the spool 15a2 is calculated by adding or subtracting the derived spool absolute position above to or from the reference position P0. The reference position P0 can be set to an idling position at the pressure increasing in the initial stage of brake pedal 11 depression, a holding position under the brake control being executed or the idling position at the pressure decreasing operation.

The first control portion 17e executes an excess response suppression priority control that controls the pilot pressure (input pressure) such that the servo pressure (output pressure) is within a first area set based on the braking target hydraulic pressure, as a reference pressure. It is noted that the first area is an area formed by the value separated from the center of the braking target hydraulic pressure by a first judging threshold value. The lower limit value of the first area is a value of the braking target hydraulic pressure subtracted by the first judging threshold value and the upper limit of the first area is a value of the braking target hydraulic pressure added by the first judging threshold value. In more detail, the first control portion 17e adjusts the pilot pressure by controlling the pressure supply device 15b to perform a feed-back control or a feed-forward control such that the detected servo pressure (actual servo pressure) becomes the braking target hydraulic pressure. The first control portion 17e inputs the braking target hydraulic pressure from the braking target hydraulic pressure calculating portion 17b and at the same time inputs the hydraulic pressure (actual servo pressure) from the hydraulic pressure obtaining portion 17c.

For example, the first control portion 17e adjusts the pressure decreasing valve 15b6 and the pressure increasing valve 15b7 so that the difference between the braking target hydraulic pressure and the actual servo pressure becomes decreased. (Feed-back Control). Further, the first control portion 17e may adjust the pressure decreasing valve 15b6 and the pressure increasing valve 15b7 in advance so that the difference between the braking target hydraulic pressure and the actual servo pressure may not be generated. (Feed-forward Control). Further, the first control portion 17e may execute both of the feed-back control and the feed-forward control.

The second control portion 17f executes a responsiveness priority control which cancels the response delay of the booster mechanism 15 by raising the pressure increasing speed or the pressure decreasing speed of the pilot pressure (input pressure) higher than that in the excess response suppression priority control. For example, the second control portion 17f controls the pilot pressure by driving the spool 15a2 by controlling the pressure supply device 15b (drive portion) based on the spool relative position (or the spool absolute position) derived by the spool position deriving portion 17d. In other words, the second control portion 17f calculates the control flow-rate corresponding to the spool relative position and controls the pressure supply device 15b (particularly, the pressure increasing valve 15b7 and the pressure decreasing valve 15b6) to have the flow-rate to be the calculated control flow-rate.

When the regulator 15a is shifted from the holding state to the pressure increasing state, the second control portion 17f enlarges the change width per unit time of the pilot pressure in a direction where the output pressure increases more in a case where the relative position derived from the spool position deriving portion 17d is within a range from the relative position in the holding state (for example, the holding position) to the relative position that the spool 15a2 has slidably moved by a pressure increasing overlapping distance (idling position at the pressure increasing operation) than in a case where the relative position of the spool 15a2 is out of the range (for example, the relative position is in further pressure increasing side than the idling position at the pressure increasing operation). In other words, the second control portion 17f increases the control flow-rate (flow-rate per unit time) to the pilot chamber R11.

When the regulator 15a is shifted from the holding state to the pressure decreasing state, the second control portion 17f enlarges the change width per unit time of the pilot pressure in a direction where the output pressure decreases more in a case where the relative position derived from the spool position deriving portion 17d is within a range from the relative position in the holding state (for example, the holding position) to the relative position that the spool 15a2 has slidably moved by a pressure decreasing overlapping distance (idling position at the pressure decreasing operation) than in a case where the relative position of the spool 15a2 is out of the range. In other words, the second control portion 17f increases the control flow-rate (flow-rate per unit time) to the pilot chamber R11.

It is noted here that the pressure increasing overlapping distance means the distance from the holding position to the idling position at the pressure increasing operation under the spool 15a2 being overlapping (both ports PT13 and PT14 are closed thereby). The pressure decreasing overlapping distance means the distance from the holding position to the idling position at the pressure decreasing operation under the spool 15a2 being overlapping.

It is noted here that the responsiveness priority control by the second control portion 17f may be a control in which the control amount of the pilot pressure (input pressure) is progressively decreased or increased according to the braking target hydraulic pressure. For example, the control amount may be calculated by multiplying the braking target hydraulic pressure by the gain which is set at a large value, as the deviation between the braking target hydraulic pressure and the actual hydraulic pressure becomes large.

The switching portion 17g switches over the control between the excess response suppression priority control by the first control portion 17e and the responsiveness priority control by the second control portion 17f based on the braking target hydraulic pressure state. In other words, the switching portion 17g switches the control over to the excess response suppression priority control executed by the first control portion 17e when the braking target hydraulic pressure is in a holding state and switches the control over to the responsiveness priority control executed by the second control portion 17f when the braking target hydraulic pressure is in the pressure increasing state or in the pressure decreasing state.

The switching portion 17g includes a judging portion 17g1 which judges whether the braking target hydraulic pressure is in the holding state or in the pressure increasing state or the pressure decreasing state. The judging portion 17g1 judges that the braking target hydraulic pressure is in the holding state when the maximum and the minimum values of the braking target hydraulic pressure in a first predetermined time period are within a first predetermined range, the braking target hydraulic pressure inclination is within a second predetermined range, or the difference between the number of pressure increasing operations and the number of pressure decreasing operations of the braking target hydraulic pressure in the second predetermined time period is within a third predetermined range. The judging portion 17g1 judges that the braking target hydraulic pressure is in the pressure increasing state or in the pressure decreasing state when the braking target hydraulic pressure is in a condition other than the conditions stated above. The switching portion 17g may judge that the braking target hydraulic pressure is in the holding state when any two or more of the above three conditions are satisfied.

It is noted here that when the braking target hydraulic pressure is judged to be in the holding state by the judging portion 17g1, and that when the difference between the braking target hydraulic pressure and the actual hydraulic pressure is larger than a second judging threshold value (judging threshold value), the switching portion 17g switches over the control to the responsiveness priority control executed by the second control portion 17f. Thus, compared to the case of execution of the excess response suppression priority control, the actual hydraulic pressure can be approximated more to the braking target hydraulic pressure in an early timing. It is noted that the second judging threshold value may be set to the value same to the first judging threshold value or larger than the first judging threshold value.

Figure 3:
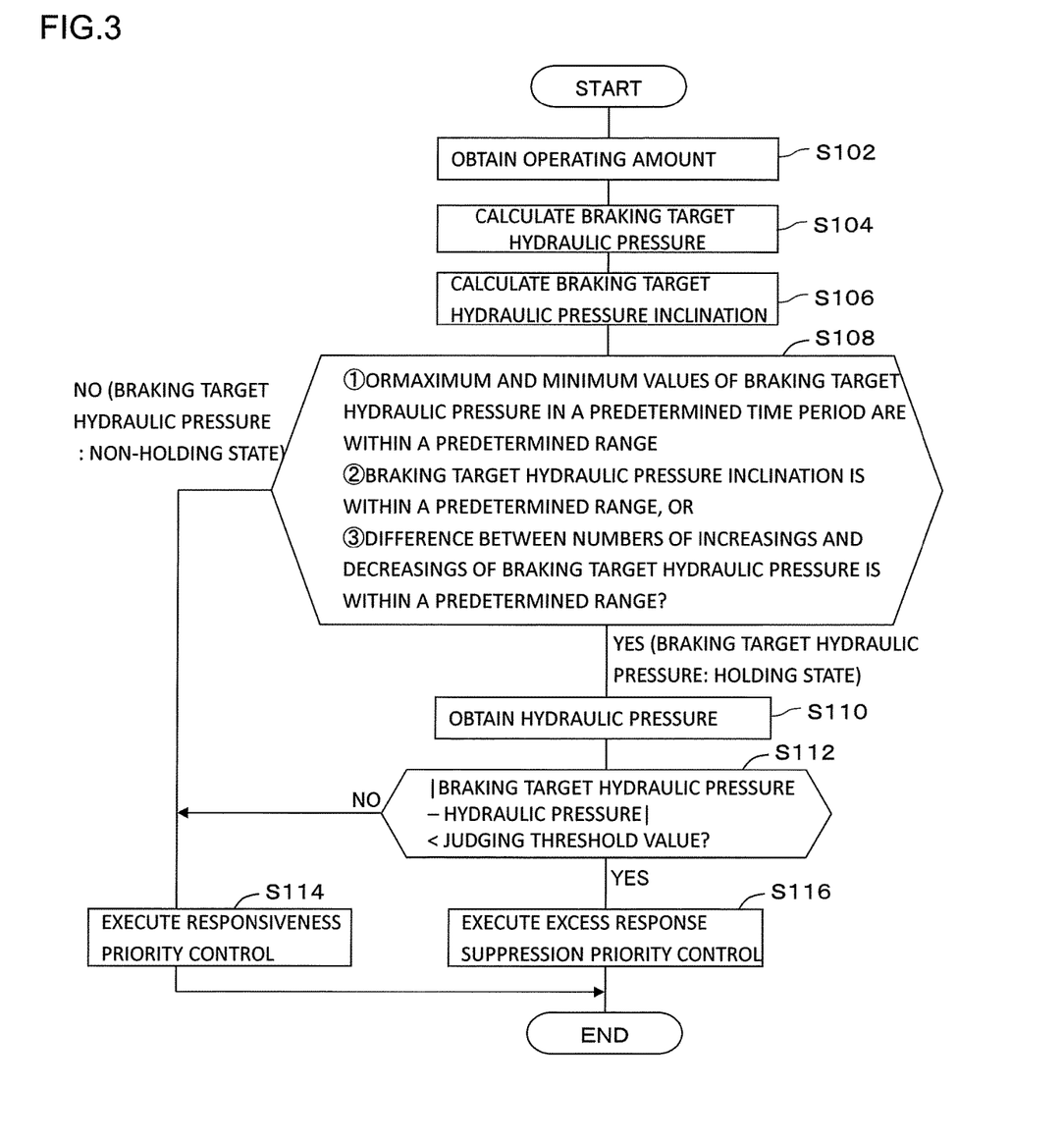
FIG. 3 is a flowchart of a control program which is executed at the brake ECU indicated in FIG. 1.

Further, the operation of the vehicular braking device will be explained with reference to the flowchart shown in FIG. 3. The brake ECU 17 executes the program along the flowchart per every predetermined time. The brake ECU 17 obtains the operating amount of the brake pedal 11 from the stroke sensor 11c at the step S102. The step S102 corresponds to the step for execution process by the operating amount obtaining portion 17a, as explained above. It is noted here that as an alternative way, at the step S102, the required braking force (or the required deceleration) may be obtained from other systems such as for example, a pre-crash system in which a collision is prevented by generating automatically the braking force when the system detects a high risk of collision.

At the step S104, the brake ECU 17 calculates the braking target hydraulic pressure in response to the operating amount (stoke) or the required braking force from other system. The step S104 corresponds to the step for execution process by the braking target hydraulic pressure calculating portion 17b.

At the step S106, the brake ECU 17 calculates the braking target hydraulic pressure inclination which is an inclination of the braking target hydraulic pressure from the braking target hydraulic pressure calculated at the step S104. For example, the braking target hydraulic pressure inclination can be calculated by dividing the difference between the previous time calculated braking target hydraulic pressure and the this time (present time) calculated braking target hydraulic pressure by the control cycle. Further, the braking target hydraulic pressure inclination may be calculated as a mean value of the previous several times calculated braking target hydraulic pressure inclinations.

The brake ECU 17 judges at the step S108 whether the braking target hydraulic pressure is in the holding state or in the pressure increasing state or the pressure decreasing state (non-holding state). The step S106 corresponds to the step for execution process by the judging portion 17g1. The brake ECU 17 judges that the braking target hydraulic pressure is in the holding state when the maximum value and the minimum value of the braking target hydraulic pressure within the first predetermined time period (within a first predetermined time dating back from the current time) are within the first predetermined range. On the other hand, the brake ECU 17 judges that the braking target hydraulic pressure is in the non-holding state when the condition thereof is otherwise. It is noted that the first predetermined range may be set to the same range with the first area.

Further, when the braking target hydraulic pressure inclination is within the second predetermined range, the brake ECU 17 judges that the braking target hydraulic pressure is in the holding state. On the other hand, the brake ECU 17 judges that the braking target hydraulic pressure is in the non-holding state, when the condition of the braking target hydraulic pressure inclination is otherwise. It is noted that the second predetermined range is set to the range where the inclination is smaller than a gradual inclination corresponding to a slow depression speed of the brake pedal in which the brake pedal is gradually depressed or released.

Still further, the brake ECU 17 judges that the braking target hydraulic pressure is in the holding state when the difference of the number of the pressure increasing operations and the pressure decreasing operations of the braking target hydraulic pressure within the second predetermined time period (within the second predetermined time dating back from the current time) is within the third predetermined range. On the other hand, if such difference is other than above, the brake ECU 17 judges that the braking target hydraulic pressure is in the non-holding state. The number of pressure increasing operations and the pressure decreasing operations are counted as the number of this time calculated pressure increasing operations of the braking target hydraulic pressure relative to the number of the previously calculated pressure increasing operations and the number of this time calculated pressure decreasing operations of the braking target hydraulic pressure relative to the number of the previously calculated pressure decreasing operations. It is noted that the third predetermined range may be set to the same range with the first area.

At the step S108, the brake ECU 17 judges that the braking target hydraulic pressure is in the holding state when one of the above three conditions is satisfied. It is also configured that at the step S108, the brake ECU 17 judges that the braking target hydraulic pressure is in the holding state when at least two of the above three conditions are satisfied.

The brake ECU 17 advances the program to the step S110 and thereafter when the braking target hydraulic pressure is judged to be in the holding state. At the step S110, the brake ECU 17 obtains the servo pressure which is the actual hydraulic pressure from the pressure sensor 26*a*. The step S110 corresponds to the step for execution process by the hydraulic pressure obtaining portion 17*c*.

At the step S112, the brake ECU 17 judges whether the difference between the braking target hydraulic pressure calculated at the step S104 and the actual hydraulic pressure obtained at the step S110 is greatly deviated or not. In other words, the judgement is made whether the difference (absolute value) is larger than the judging threshold value or not.

When the brake ECU 17 judges that the braking target hydraulic pressure is in the non-holding state, then judges "NO" at the step S108 and executes the responsiveness priority control at the step S114. When the braking target hydraulic pressure is in the holding state and when the actual hydraulic pressure is not deviated from the braking target hydraulic pressure by a value equal to or more than the judging threshold value, the brake ECU 17 judges "YES" at the step S112. Then, the brake ECU 17 executes the excess response suppression priority control at the step S116. On the other hand, even the braking target hydraulic pressure is in the holding state, if the actual hydraulic pressure is deviated from the braking target hydraulic pressure by the value equal to or more than the judging threshold value, the brake ECU 17 judges "NO" at the step S112 and executes the responsiveness priority control at the step S114. As explained, the step S108 and the step S112 correspond to the step for execution processes by the switching portion 17*g*.

The brake ECU 17 executes the excess response suppression priority control at the step S116. The step S116 corresponds to the step for execution process by the first control portion 17*e*. The brake ECU 17 executes the responsiveness priority control at the step S114. The step S114 corresponds to the step for execution process by the second control portion 17*f*.

As apparent from the explanation above, the vehicular braking device according to the embodiment includes a hydraulic pressure generating device which outputs an output pressure by the operation of the inputted input pressure. The hydraulic pressure generating device corresponds to a hydraulic pressure braking force generating device A (vehicular braking device) which is equipped with a booster mechanism 15 (hydraulic pressure generating device) which generates a response delay, in which the change of the output pressure relative to the change of the input pressure at the initial stage of starting the pressure increasing or pressure decreasing operation when the output pressure is intended to be increased or decreased, is delayed. The hydraulic pressure braking force generating device A includes a first control portion 17*e* which executes an excess response suppression priority control which controls the input pressure such that the output pressure is within the first area which is set based on the braking target hydraulic pressure, as a reference, a second control portion 17*f* which executes the responsiveness priority control that cancels the response delay by setting the pressure increasing speed or pressure decreasing speed of the input pressure to be faster than that in the excess response suppression priority control and a switching portion 17*g* which switches over a control between the excess response suppression priority control executed by the first control portion 17*e* and the responsiveness priority control executed by the second control portion 17*f* based on the state of the braking target hydraulic pressure.

According to the structure above, even the response delay of the change of the output pressure relative to the change of the input pressure at the initial stage of starting the pressure increasing or decreasing operation is generated in the booster mechanism 15, the responsiveness priority control is executed by the second control portion 17*f*. As a result, the response delay can be cancelled to be able to improve the responsiveness at the initial stage of starting the pressure increasing or decreasing operation. Further, the responsiveness priority control and the excess response suppression priority control can be appropriately switched over by the switching portion 17*g*. Thus, a hydraulic pressure braking force generating device A which can further improve the responsiveness and at the same time achieve an excess response suppression, can be proposed.

Further, the hydraulic pressure braking force generating device A includes a braking target hydraulic pressure calculating portion 17*b* which calculates the braking target hydraulic pressure according to the operating state of the brake pedal 11 (brake operating member) or a demand from other system, wherein the switching portion 17*g* switches over a control to the excess response suppression priority control executed by the first control portion 17*e*, when the braking target hydraulic pressure is in the holding state and switches over the control to the responsiveness priority control executed by the second control portion 17*f*, when the braking target hydraulic pressure is in the pressure increasing state or the pressure decreasing state. Thus, the switching over operation between the excess response suppression priority control and the responsiveness priority control can be surely and accurately performed based on the state of the braking target hydraulic pressure.

Further, the switching portion 17*g* of the hydraulic pressure braking force generating device A includes a judging portion 17*g*1 which judges that the braking target hydraulic pressure is in the holding state, when the maximum value and the minimum value of the braking target hydraulic pressure within a first predetermined time period are within the first predetermined range, the braking target hydraulic pressure inclination is within the second predetermined range, or the difference between the number of the pressure increasing operations and the number of the pressure decreasing operations of the braking target hydraulic pressure within a second predetermined time period is within a third predetermined range and judges that the braking target hydraulic pressure is in the pressure increasing state or the pressure decreasing state when the condition of the braking target hydraulic pressure is other than the above conditions. According to this structure, the judging portion 17g1 surely judges the state of the braking target hydraulic pressure.

Further, the switching portion 17g of the hydraulic pressure braking force generating device A switches over the control to the responsiveness priority control executed by the second control portion 17f when the braking target hydraulic pressure is in the holding state and the difference between the braking target hydraulic pressure and the actual hydraulic pressure is larger than the judging threshold value. Therefore, even the braking target hydraulic pressure is in the holding state, if the actual hydraulic pressure is deviated from the braking target hydraulic pressure, the actual hydraulic pressure can approximate the braking target hydraulic pressure with a good responsiveness.

In the hydraulic pressure braking force generating device A, the responsiveness priority control executed by the second control portion 17f is a control that increases or decreases the control amount of the input pressure progressively in response to the braking target hydraulic pressure. This can properly control the input pressure based on the braking target hydraulic pressure and eventually can properly execute the responsiveness priority control.

REFERENCE SIGNS LIST

11; brake pedal, 12: master cylinder, 13; stroke simulator portion, 14; reservoir, 15; booster mechanism (hydraulic pressure generating device), 15a; regulator, 15b; pressure supply device (drive portion), 15b1; reservoir (low pressure source), 15b2; accumulator (high pressure source), 15b6; pressure decreasing valve, 15b7; pressure increasing valve, 16; actuator, 17; brake ECU, 17a; operating amount obtaining portion, 17b; braking target hydraulic pressure calculating portion, 17c; hydraulic pressure obtaining portion, 17d; spool position deriving portion, 17e; first control portion, 17f; second control portion, 17g; switching portion, 17g1; judging portion, A; hydraulic pressure braking force generating device (vehicular braking device), WC; wheel cylinder

The invention claimed is:

1. A vehicular braking device comprising:
   a hydraulic pressure generating device which outputs an output pressure by an operation of an inputted input pressure, wherein the hydraulic pressure generating device generates a response delay in which an output pressure change delays relative to an input pressure change at an initial stage of starting pressure increasing operation or at an initial stage of pressure decreasing operation when the output pressure is intended to be increased or decreased, the vehicular braking device further comprising:
   a first control portion which executes an excess response suppression priority control that controls the input pressure such that the output pressure becomes within a first area set based on a braking target hydraulic pressure as a reference;
   a second control portion which executes a responsiveness priority control that cancels the response delay by increasing an increasing speed of the input pressure or a decreasing speed thereof more than the increasing speed of the input pressure or the decreasing speed thereof at the excess response suppression priority control; and
   a switching portion which switches over a control between the excess response suppression priority control executed by the first control portion and the responsiveness priority control executed by the second control portion based on a state of the braking target hydraulic pressure.

2. The vehicular braking device according to claim 1, further comprising:
   a braking target hydraulic pressure calculating portion which calculates the braking target hydraulic pressure in response to an operating state of a brake operating member or in response to a demand from other system, wherein
   the switching portion switches over the control to the excess response suppression priority control executed by the first control portion when the braking target hydraulic pressure is in a holding state and switches over the control to the responsiveness priority control executed by the second control portion when the braking target hydraulic pressure is in a pressure increasing state or a pressure decreasing state.

3. The vehicular braking device according to claim 2, wherein the switching portion includes a judging portion, wherein
   the judging portion judges that the braking target hydraulic pressure is in the holding state when at least one of a condition that a maximum value and a minimum value of the braking target hydraulic pressure in a first predetermined time period are within a first predetermined range, a condition that a braking target hydraulic pressure inclination is within a second predetermined range and a condition that a difference between a number of pressure increasing operations and a number of pressure decreasing operations in a second predetermined time period is within a third predetermined range is satisfied and judges that the braking target hydraulic pressure is in the pressure increasing state or the pressure decreasing state when none of the conditions are satisfied.

4. The vehicular braking device according to claim 1, wherein the switching portion switches over the control to the responsiveness priority control executed by the second control portion when the braking target hydraulic pressure is in the holding state and at the same time when a difference between the braking target hydraulic pressure and an actual hydraulic pressure is larger than a judging threshold value.

5. The vehicular braking device according to claim 1, wherein the responsiveness priority control executed by the second control portion is a control that increases or decreases a control amount of the input pressure progressively in response to the braking target hydraulic pressure.

* * * * *